No. 793,929. PATENTED JULY 4, 1905.
N. T. HARRINGTON.
CONTROLLING MECHANISM FOR VARIABLE SPEED TRANSMISSION.
APPLICATION FILED NOV. 21, 1904.

2 SHEETS—SHEET 1.

Inventor
Norman T. Harrington
By James C. Whittemore
atty.

Witnesses

No. 793,929. PATENTED JULY 4, 1905.
N. T. HARRINGTON.
CONTROLLING MECHANISM FOR VARIABLE SPEED TRANSMISSION.
APPLICATION FILED NOV. 21, 1904.
2 SHEETS—SHEET 2.
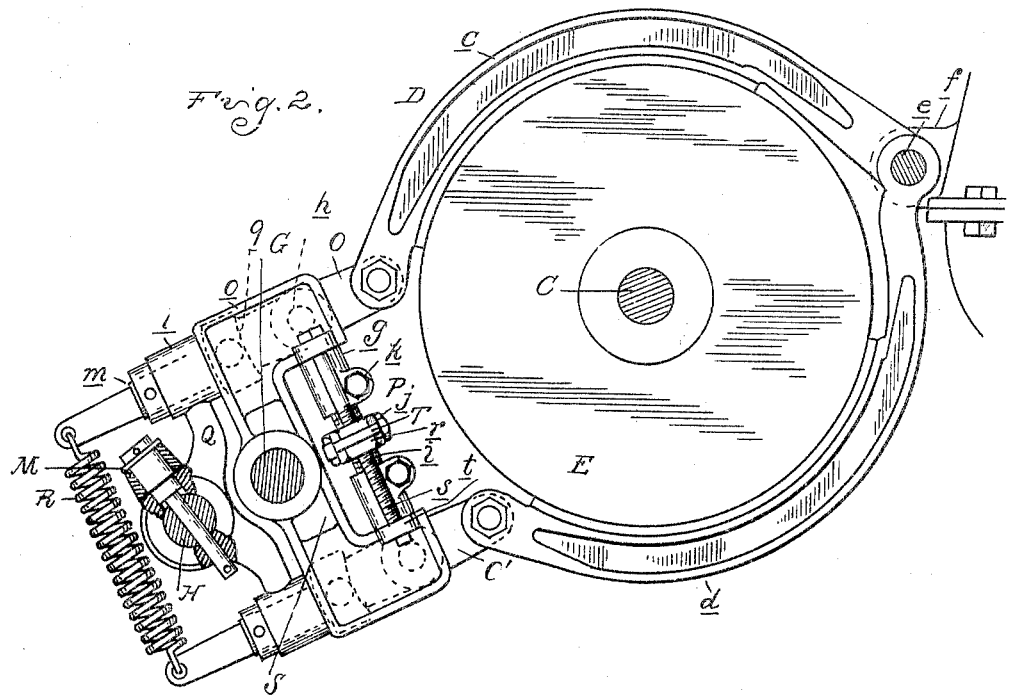
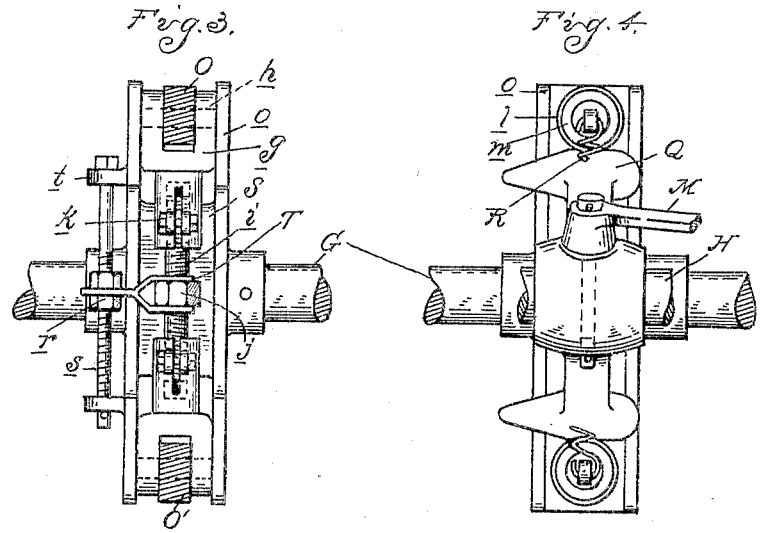
Witnesses
Geo. H. Gurney
H. C. Smith
Inventor
Norman T. Harrington
By James C. Whittemore
Atty.

No. 793,929.

Patented July 4, 1905.

UNITED STATES PATENT OFFICE.

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

CONTROLLING MECHANISM FOR VARIABLE-SPEED TRANSMISSION.

SPECIFICATION forming part of Letters Patent No. 793,929, dated July 4, 1905.

Application filed November 21, 1904. Serial No. 233,641.

*To all whom it may concern:*

Be it known that I, NORMAN T. HARRINGTON, a citizen of the United States, residing at Detroit, in the county of Wayne and State of Michigan, have invented certain new and useful Improvements in Controlling Mechanism for Variable-Speed Transmission, of which the following is a specification, reference being had therein to the accompanying drawings.

The invention relates to transmission mechanism, and more particularly to the planetary type; and the invention consists in the peculiar construction of the means employed for controlling said transmission.

Figure 1:
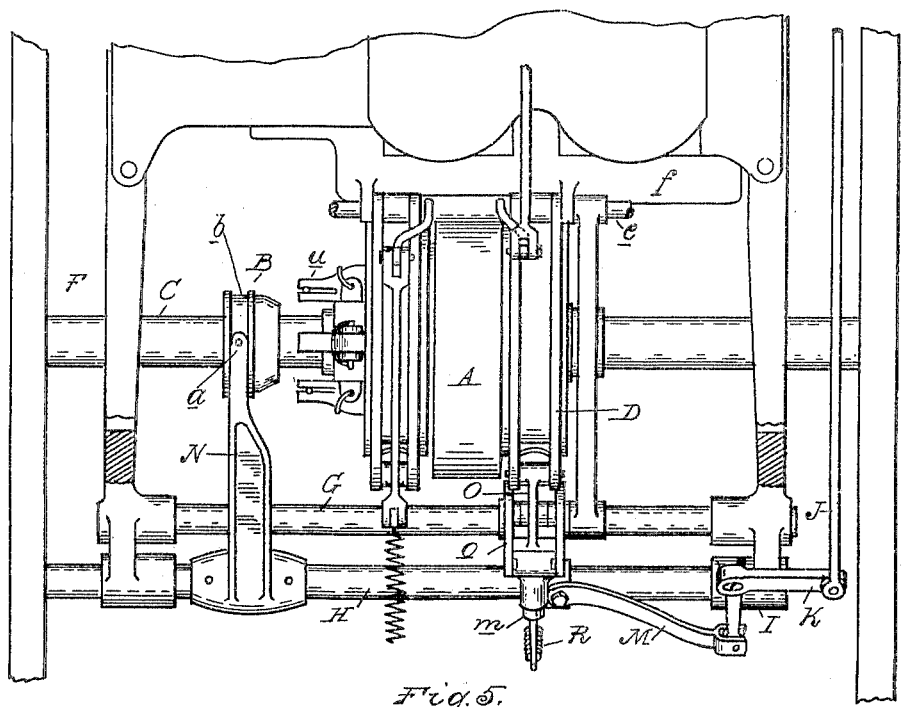
Figure 5:
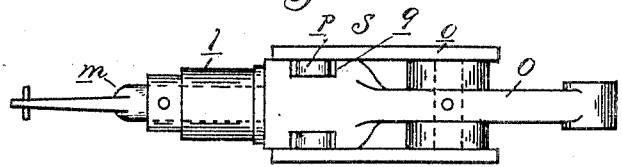

In the drawings, Figure 1 is a plan view of the mechanism. Fig. 2 is a sectional side elevation. Fig. 3 is a cross-section through the brake-actuating levers. Fig. 4 is a rear elevation thereof, and Fig. 5 is an enlarged view of a portion of Fig. 1.

A is a variable-speed transmission of the planetary type and of any suitable construction.

B is the member for operating the high-speed clutch, which is longitudinally slidable on the shaft C, upon which the transmission is mounted.

D is a peripheral brake for controlling one of the other speeds of the transmission—as, for instance, the low speed forward—said brake surrounding a revoluble head E. As the particular construction of the transmission forms no part of my present invention, it is not illustrated in the drawings.

The transmission-shaft C is mounted in suitable bearings upon a supporting-frame F, which comprises side frames and cross-bars, and one of the cross-bars G is in the form of a rod or tube, which extends between the side frames in rear of the transmission. Adjacent to and parallel with this rod is a slidable rod H, which engages suitable bearings I in the side frames.

J is an actuating-rod for the sliding rod H, which is connected thereto through the medium of a bell-crank lever K and link M, the rod J leading to a suitable controlling-lever. (Not shown.)

The sliding rod H, which is parallel to the axis of the transmission-shaft C, forms an actuating member for the various speed-controlling devices, which are of the following construction: As has been stated, the high-speed clutch is operated by the slidable member B, which is in the form of a conical collar sleeved upon the shaft C. This member is actuated from the rod H, through the medium of an arm N, which is rigidly secured to the rod and has a bifurcated end portion $a$ for embracing the collar B and engaging a groove $b$ therein. The arm N is also cut away to embrace the rod G.

The brake D is adapted to be engaged or disengaged from the head E through the medium of mechanism of the following construction: The brake preferably comprises a pair of segmental shoes $c$ and $d$, which are pivotally connected to each other at $e$ and also to the member $f$ of the frame. These brake-shoes extend upon opposite sides of the head E and are connected at their free ends with levers O and O'. These levers extend parallel to each other, respectively above and below the frame-bar G and sliding rod H, as illustrated in Fig. 2. P is a fulcrum-link pivotally connected at its opposite ends to the levers O and O'. This link is adjustable in length and comprises the bifurcated members $g$, which embrace the levers and are pivoted thereto by the pins $h$, said members $g$ being also provided with threaded split sockets for engaging the threaded shank $i$. This shank is provided with right and left hand threads at its opposite ends and with a central polygonal head $j$, by means of which it may be adjusted to alter the length of the link P. When adjusted, it is fixedly secured to the socket member $g$ by clamping-bolts $k$ for the latter.

The levers O and O' extend rearward from the fulcrum-link P and are provided with anti-friction-rolls $l$, sleeved upon a reduced shank $m$. These rolls extend in the path of cams Q, secured to the sliding rod H, the arrangement being such that in the movement of said rod said cams will bear against the rolls $l$ to support the rear ends of the levers O O', thereby drawing their forward ends toward each other and applying the brake-shoes c and d to the head E. For holding the shoes normally out of engagement with the brake-head a spring R is connected to the ends of the shank m.

Inasmuch as the movement of the cams Q is transverse to the plane of movement of the levers O and O', the latter must be held from lateral displacement. For this purpose a member S is secured to the rod G and is bifurcated at its opposite ends to form cheek-plates o, embracing the opposite sides of the levers O and O'. The cheek-plates o are further provided with guides p upon their inner faces, which engage with grooves q in the rear ends of the levers O and O', so as to prevent longitudinal movement of said levers while permitting them to be rocked in the plane of movement. The guides p are preferably of segmental form, and sufficient clearance is provided for said guides in the grooves q to prevent binding of the levers.

To prevent the upper shoe c from resting upon the head E when the levers O and O' are in released position, a centering member is provided for engaging with the link P. As shown, this comprises a bifurcated bracket T, which embraces the polygonal head j on the shank i. The member T is secured by nuts r to a threaded rod s, which is secured to ears t, formed on the member S. This construction serves to hold the link P in central position, so that when the levers are released the shoes will be moved oppositely from the brake-head. At the same time the arm T is sufficiently flexible to permit of said shoes to sit against the brake-head.

The construction being as shown and described in operation the actuation of the rod J will transmit reciprocatory movement to the slidable rod H through the bell-crank K and link M tangential to the rod H. When said rod H is moved in one direction, it will cause the arm N to slide the collar B, so as to engage the same with the operating-dogs u on the high-speed clutch, thereby throwing said clutch into operation. When the rod H is moved in the opposite direction, the cams Q thereon will be brought into engagement with the antifriction-rolls l on the levers O and O'. This will separate said levers, as has been described, and cause the application of the brake-shoes c and d of the peripheral brake D, thereby arresting movement of the revoluble head E and causing the operation of the low-speed transmission or other gearing controlled thereby.

What I claim as my invention is—

1. The combination with a revoluble brake-head, of a pair of shoes embracing the same, a pair of parallel levers engaging said shoes, an adjustable fulcrum-link connecting said levers, and means for separating the opposite ends of said levers to cause the application of said brake-shoes to said head.

2. The combination with a revoluble brake-head, of a pair of segmental brake-shoes embracing the same, a pair of parallel levers connecting to said brake-shoes, a fulcrum-link connecting said levers, a spring connecting the opposite ends of said levers and means intermediate said spring and fulcrum for separating said levers to apply said shoes to said head.

3. The combination with a revoluble brake-head, of a pair of segmental brake-shoes embracing the same, a pair of parallel levers engaging said shoes, a fulcrum-link connecting said levers, a member movable transversely of the plane of movement of said levers, adapted to separate the same to apply said shoes to said head and guides for holding said levers from lateral displacement.

4. The combination with a revoluble brake-head, of a pair of segmental brake-shoes embracing the same, a pair of parallel levers engaging said shoes, a fulcrum-link connecting said levers and adjustable to change the distance therebetween and means for separating the opposite ends of said levers to apply said shoes to said head.

5. The combination with a revoluble brake-head, of a segmental brake-shoe embracing the same, a stationary pivot for one end of said shoe, a lever connected to the opposite end of said shoe, a link in which said lever is fulcrumed, a member movable transverse to the plane of movement of said lever, adapted to engage near the opposite end thereof to actuate the same, and cheek-plates embracing said lever and holding the same from lateral displacement.

6. The combination with a revoluble brake-head, of a segmental brake-shoe embracing the same, a stationary member to which one end of said shoe is pivoted, a lever connected to the opposite end of said shoe, a link in which said lever is fulcrumed, an antifriction-roll on said lever near the opposite end thereof, a rod slidable transverse to the plane of movement of said lever, a cam on said rod for engaging said antifriction-roll and cheek-plates embracing said lever and holding the same from lateral displacement.

7. The combination with a revoluble brake-head, of a segmental brake-shoe embracing the same, a lever for actuating said brake-shoe, a member movable transverse to the plane of movement of said lever for actuating the latter, cheek-plates embracing said lever and holding the same from lateral displacement and a guide on said cheek-plate engaging said lever and preventing longitudinal movement thereof.

8. The combination with a revoluble brake-head, inclosing a transmission-gearing, organized to transmit a plurality of different movements of the shaft on which said brake-head is mounted, of a peripheral brake controlling a movement of said transmission through said brake-head, a slidable rod parallel to the axis of said shaft, a lever for actuating said peripheral brake, a cam on said slidable rod for actuating said lever, and means connected to said slidable rod for controlling a second movement of said transmission.

9. The combination with a revoluble brake-head, of a pair of brake-shoes embracing the same, a pair of parallel levers for actuating said brake-shoes, the adjustable link P in which said levers are fulcrumed, having a central polygonal adjusting-head and means for separating the opposite ends of said levers and a bifurcated bracket engaging said polygonal head for holding said link in a central position during the movement of said levers.

In testimony whereof I affix my signature in presence of two witnesses.

NORMAN T. HARRINGTON.

Witnesses:
H. C. SMITH,
ED. D. AULT.